United States Patent [19]
Willner et al.

[11] Patent Number: 5,984,548
[45] Date of Patent: Nov. 16, 1999

[54] DATA ENTRY SYSTEM

[75] Inventors: Michael A. Willner, Mason Neck, Va.; Scott M. Arnel, Syosset, N.Y.

[73] Assignee: Wilnel, Inc., Mason Neck, Va.

[21] Appl. No.: 09/170,652

[22] Filed: Oct. 14, 1998

Related U.S. Application Data

[62] Division of application No. 08/934,648, Sep. 22, 1997.

[51] Int. Cl.$^6$ ........................................................ B41J 5/08
[52] U.S. Cl. ............................ 400/472; 400/485; 400/100
[58] Field of Search .................................... 400/472, 485, 400/487, 691, 715, 489, 100, 91, 92, 93; 341/22; 345/168; 463/37

[56] References Cited

U.S. PATENT DOCUMENTS

| | | | |
|---|---|---|---|
| 4,344,069 | 8/1982 | Prame | 400/485 X |
| 4,992,631 | 2/1991 | Gee | 200/5 A |
| 5,012,230 | 4/1991 | Yasuda | 345/160 |
| 5,207,426 | 5/1993 | Inoue et al. | 463/36 |
| 5,394,168 | 2/1995 | Smith, III et al. | 345/156 |
| 5,498,843 | 3/1996 | Date et al. | 200/6 A |
| 5,781,127 | 7/1998 | Kleve | 400/489 X |
| 5,828,323 | 10/1998 | Bartet | 400/100 X |

OTHER PUBLICATIONS

Owner manuel for Microsoft SideWinder Game Pad (Property of Examiner Charles Nolan) Copyright 1996.
P. J. Kennedy, "Hand–Held Data Input Device", IBM Technical Disclosure Bulletin, vol. 26, No. 11, pp. 5826–5827, Apr. 1984.

*Primary Examiner*—Edgar Burr
*Assistant Examiner*—Minh H. Chau
*Attorney, Agent, or Firm*—Rosenberg, Klein & Bilker

[57] ABSTRACT

A data entry system (100, 100') has an ergonomic base (102, 102') including upper surface controls (104, 104') which generate a first set of electrical signals, and side surface controls (106, 106') which generate a second set of electrical signals when operated independently. A third set of electrical signals are generated when the side surface controls (106, 106') are operated in combination with the upper surface controls (104, 104'). Data entry system (100, 100') further includes mode selection controls (108) for establishing the first, second and third sets of electrical signals as device control signals responsive to a first mode being selected and respective sets of alphanumeric and keyboard control signals responsive to a second mode being selected.

6 Claims, 7 Drawing Sheets

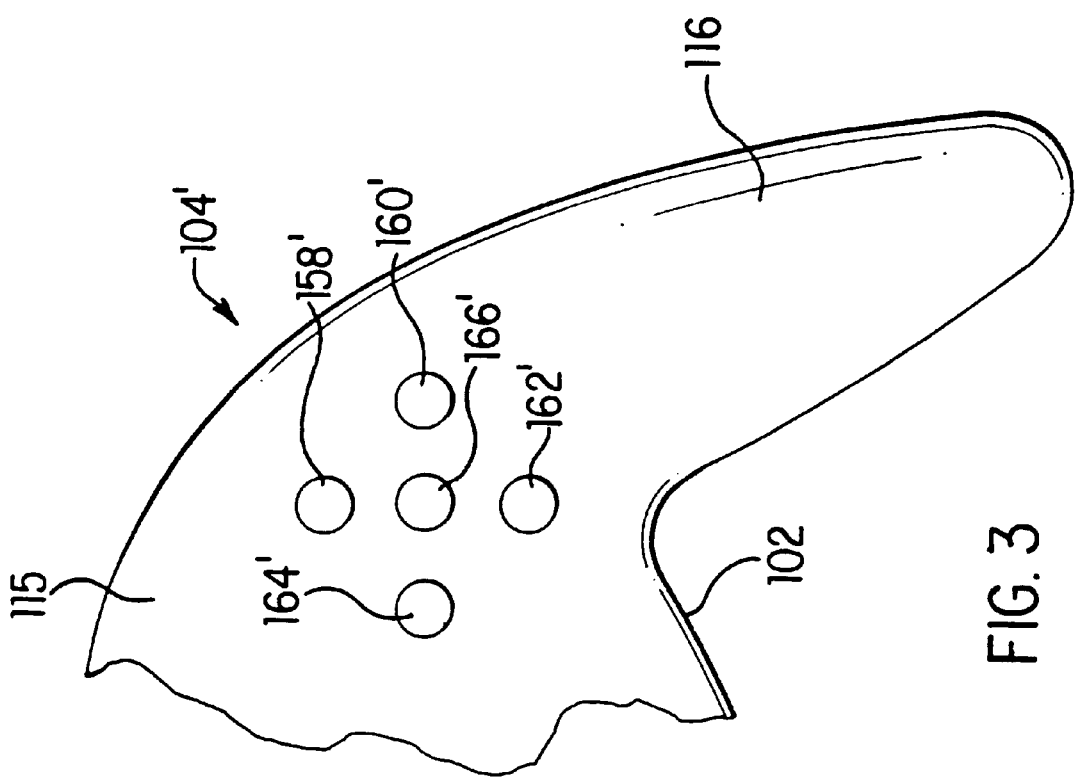

DATA ENTRY SYSTEM

This application is a divisional of copending application Ser. No. 08/934,648 filed on Sep. 22, 1997.

BACKGROUND OF THE INVENTION

1. Field of the Invention

This invention directs itself to ergonomic keyboard systems for providing data entry to one or more devices. In particular, this invention directs itself to a data entry system which can function as a game controller and as an ergonomic keyboard. Still further, this invention directs itself to a data entry system having an ergonomic base with a central support portion supporting a plurality of upper surface controls. The ergonomic base further includes a back side having a plurality of side surface controls. More in particular, this invention pertains to a data entry system wherein upper surface controls and side surface controls can be used independently, or in combination to provide alphanumeric and keyboard control signals in a keyboard mode, while also functioning independently in a device mode.

2. Prior Art

Keyboard data entry systems and game controllers are well known in the art. The best prior art known to the Applicants include U.S. Pat. No. 5,493,654; No. 5,486,058; No. 5,481,263; No. 5,479,163; No. 5,451,053; No. 5,432,510; No. 5,426,449; No. 5,408,621; No. 5,332,322; No. 5,317,505; No. 5,207,426; No. 5,160,919; No. 5,137,384; No. 4,917,516; No. 4,655,621; No. 4,552,360; No. 4,833,446; No. 4,727,478; No. 4,680,577; No. 4,518,164; No. 4,516,939; No. 4,443,789; No. 4,442,506; No. 4,360,892; No. 3,990,565; German Patent #30804; PCT Publication #WO86-05143; European Published Patent Application #EP213022; the publication entitled "Semi-captive Keyboard", *Xerox Disclosure Journal*, Vol. 1, No. 2, February 1976; and, the publication entitled "Hand-held Data Input Device", *IBM Technical Disclosure Bulletin*, Vol. 26, No. 11, April 1984.

Some prior art systems, such as that shown in U.S. Pat. No. 3,990,565; No. 5,137,384; No. 5,160,919; and, No. 5,426,449 are directed to ergonomic keyboard systems wherein the user's hands are substantially vertically oriented when the keyboard is used. Such systems disclose utilizing somewhat standard QWERTY keyboard formats, as opposed to chord type systems. However, such systems do not disclose or suggest the combination of a keyboard with a game controller.

In other prior art systems, such as that disclosed in U.S. Pat. No. 5,408,621, there are provided multi-directional switches for use in entering data into a computer. Through utilization of two twelve position directional type switches, one hundred and forty-four different input combinations are generated to provide input of alphanumeric and other symbols. However, such does not disclose the combination of a keyboard data entry system and a game controller and does not provide for data entry utilizing both the thumbs and fingers of both hands of the user, to provide for high speed data entry.

In still other systems, such as that disclosed by U.S. Pat. No. 4,552,360 and No. 4,518,164, video game controllers are disclosed which include a numeric keypad. While the keypad provides for limited data entry, such is intended to allow input of information to the video game computer during play, to select skill levels, initiate the game, or the like. Such systems do not include any mode controls for utilization of the multi-directional switches for generation of alphanumeric characters in a keyboard mode.

Over the years, many prior art systems have presented alternatives to the QWERTY format as a means of increasing typing speed. While those systems would permit a user to type faster, they required a user to learn the new keyboard layout. In spite of the potential typing speed increase, the public has been loath to adopt any keyboard format other than the old QWERTY arrangement. It is clear that once typists become familiar with a keyboard layout, a promised increase in typing speed is not sufficient motivation to learn an additional keyboard arrangement.

During the past decade there has been a tremendous growth in the use and ownership of computer and video games. As a result, children and young adults have become very accustomed to handling and using game controllers that incorporate multidirectional switches. This growing portion of the keyboard-using population is likely to adopt a keyboard format that is arranged like a game controller, can function as a game controller, is ergonomically designed, allows users to enter data while seated in a reclined position away from a desk and offers greater typing speed. The likelihood of the instant invention being adopted by a large segment of the keyboard-using public is further enhanced by the fact that the instant invention requires a minimal number of simultaneous depression of keys.

SUMMARY OF THE INVENTION

A data entry system is provided. The data entry system includes an ergonomic housing adapted to be held by two hands of a user. The data entry system also includes a plurality of switches mounted on the housing for operation by at least one digit of the user's hands, and a switching assembly mounted on the housing for selecting between a first operating mode and a second operating mode. The data entry system further includes a circuit for coupling an output of at least a portion of the plurality of switches as game input data responsive to the switching assembly selecting the first operating mode and converting an output of at least a portion of the plurality of switches to alphanumeric character code data responsive to the switching assembly selecting the second operating mode.

Looking at the data entry system in another way, such includes an ergonomic base adapted to be graspable by two hands of a user, the ergonomic base having an upper surface and a side surface. Additionally, the data entry system includes upper surface controls disposed on the ergonomic base upper surface and adapted for operation by either of two of a user's digits to generate a first set of electrical signals. Further, side surface controls are provided that are disposed on the side surface of the ergonomic base and adapted for operation by at least another of a user's digits on either of the user's two hands to generate a second set of electrical signals when operated independently and a third set of electrical signals when operated in combination with the upper surface controls. The first and second sets of electrical signals together representing at least a majority of alphabetic characters of an alphabet.

It is therefore a feature of the invention to provide a data entry system which combines the functionality of an ergonomic keyboard with that of a game controller.

It is another feature of the invention to provide a data entry system having an ergonomic base which includes a pair of hand grip portions which extend substantially orthogonally with respect to an upper surface thereof.

It is a further feature of the invention to provide a data entry system having both upper surface controls and side surface controls which respectively generate first and second sets of electrical signals, the first and second sets of electrical signals representing a majority of alphabetic characters of an alphabet.

It is still a further feature of the invention to provide upper surface controls and side surface controls which respectively generate first and second sets of electrical signals when operated independently, and generate a third set of electrical signals when operated in combination, the third set of electrical signals representing characters selected from the group consisting of numbers, punctuation, mathematical operators, words and combinations thereof.

It is yet a further feature of the invention to provide a data entry system having upper surface controls which generate signals representing alphabetic characters in a keyboard mode and directional control signals in a game controller mode.

Yet another feature of the invention is to provide a data entry system capable of generating alphabetic characters in a keyboard mode and control signals for controlling such devices as telephones, dedicated Internet interface devices, and home entertainment devices in one or more device control modes.

These and other advantages and novel features of the invention will become apparent from the following detailed description when considered in connection with the accompanying drawings.

BRIEF DESCRIPTION OF THE DRAWINGS

FIG. 3 is a cut-away plan view of an alternate configuration of a directional control of the present invention;

DESCRIPTION OF THE PREFERRED EMBODIMENTS

Figure 1:
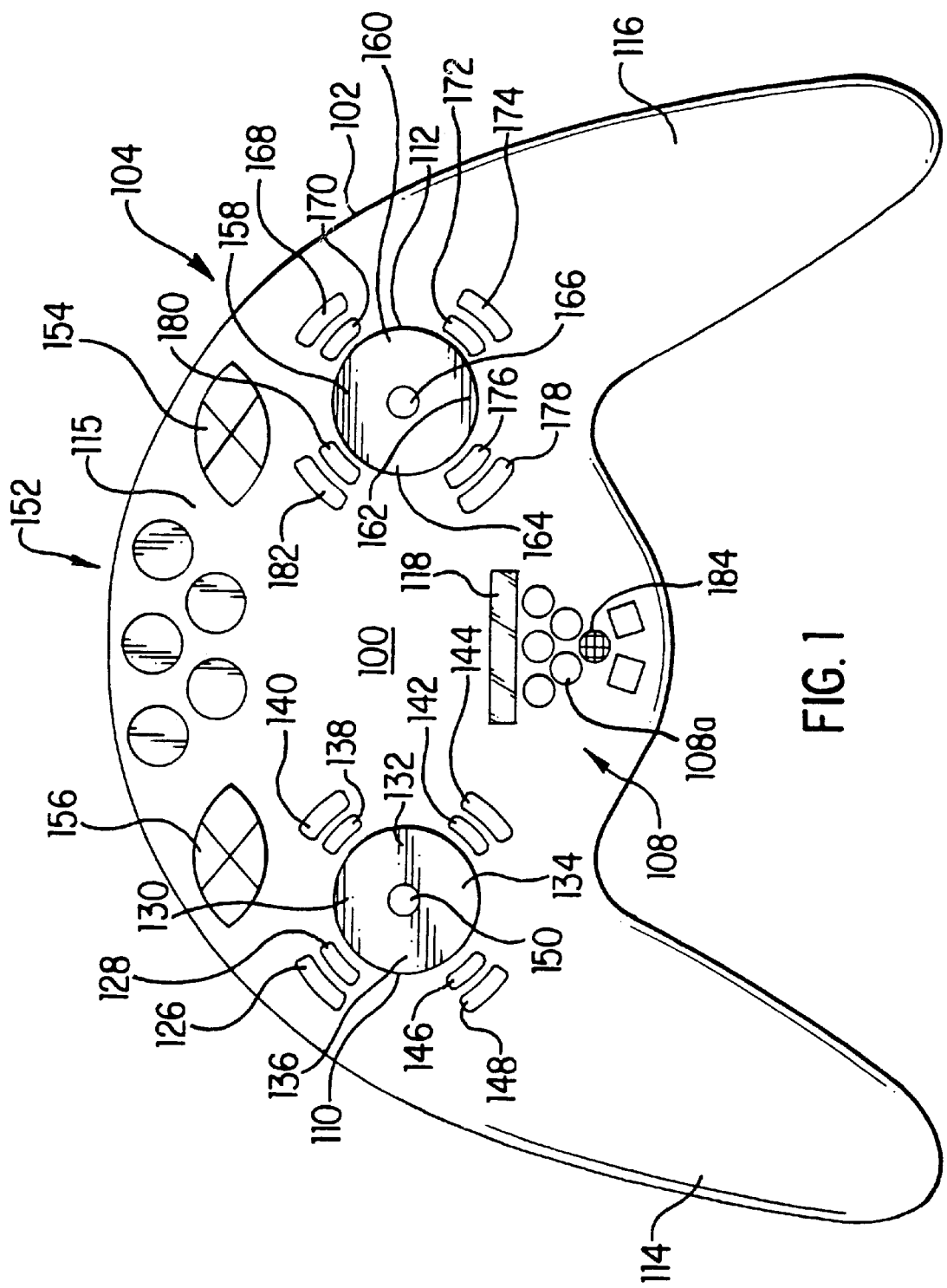
FIG. 1 is a plan view of the data entry system according to the present invention.

Referring now to FIGS. 1, 2 and 4–6, there is shown data entry system 100 which combines an ergonomic keyboard with a device controller. As will be seen in following paragraphs, data entry system 100 is specifically directed to the concept of providing a single data entry device capable of communicating with a host of computational, communication and entertainment devices, found in the workplace and in the home. Data entry system 100 functions as a fully functional 101 key keyboard for communication with a computer system 300 and dedicated Internet device 330 or any other device that utilizes an alphanumeric input, while acting as a numeric entry handset for telephone system 320. When used with telephone system 320, a microphone 184 incorporated in system 100 is used to input voice signals, while a speaker of telephone system 320 or incorporated in system 100 (not shown) provides the voice output to the user. Data entry system 100 also is capable of functioning as a game controller for use with the dedicated game system 310, or the personal computer 300, and as a remote control device for such entertainment devices as the TV or cable tuner 340, a video entertainment device 350 or an audio entertainment device 360. Thus, a single ergonomically designed base 102 provides the controls 104, 106, 108, 152 for interfacing with any one or more of the computational, communications and entertainment devices available for use in the home or office.

Referring now to FIG. 1, data entry system 100 is packaged within an ergonomic base 102 having a centrally disposed supporting portion 115 from which hand grip portions 114 and 116 angularly extend. Thus, data entry system 100 is intended to be utilized by both hands of a user. The user grasps the respective hand grip portions 114, 116 with each hand, the user's thumbs remaining extended over the central supporting portion. Both the central supporting portion 115 and each of the hand grip portions 114 and 116 include switches which the user will utilize to enter data and control signals. Those switches which are disposed on the central support portion 115 define the upper surface controls 104, such controls being intended to be individually operated by one or both thumbs of the user. The central support portion 115 also is provided with a display 118, which may include an LCD display for indicating the particular operating mode of system 100, as well as include light emitting diode (LED) indicators for indicating the enablement of the number, shift and scroll lock functions.

The primary data entry controls of upper surface controls 104 are a pair of multi-directional switch assemblies 110 and 112, commonly known as D-pads. D-pads are well known in the game controller art, and function to provide particular contact closures depending upon where the user applies pressure on an operating button thereof. When the user depresses the uppermost or northern position 130, 158 of the D-pad 110, 112, such is equivalent to depressing a key of a standard keyboard. When the user depresses the rightmost or east portion of the D-pad 132, 160, such is equivalent to a different key of a standard keyboard being depressed. Likewise, separate keystroke entries are made by depressing the southern portion 134, 162 and western portion 136, 164. It is possible to provide for yet additional keystroke entries by depression of the D-pad in portions intermediate the north, east, south and west positions without departing from the scope of the present invention. A switch pushbutton 150, 166, defining an additional keystroke entry position, may be provided centrally on each D-pad 110, 112. Thus, each D-pad 110, 112 may provide for five keystroke entries, that then may be increased utilizing chording techniques, as will be described in following paragraphs. Where switch pushbutton 150, 166 is not provided, the characters which would otherwise be generated thereby are generated by other of the upper surface control switches 104 or side surface control switches 106.

Alternately, as shown in FIG. 3, the D-pads may be replaced by four to five discrete switches. As an example, the upper surface controls 104' may include a switch pushbutton 158' disposed in the north position, a switch pushbutton 160' located in the east position, a switch pushbutton 162' located in the south position, and a switch pushbutton 164' located in the west position. Optionally, a switch pushbutton 166' may be centrally disposed with respect to switch pushbuttons 158', 160', 162' and 164'. Each of the switches being located on the central supporting portion 115 of the ergonomic base 102 are intended to be operated by the thumb of the user. Although the switch pushbuttons 158', 160', 162', 164', and 166' are shown on the right side of ergonomic base 102, it should be understood that the D-pad 110 may also be replaced by a similar arrangement of switch pushbuttons.

Referring back to FIG. 1, each of the D-pads 110, 112 are surrounded by additional switch pushbuttons for additional keystroke entries utilizing the user's thumbs. Thus, surrounding the D-pad 110 there is provided a first pair of switch pushbuttons 138 and 140 that are radially spaced and disposed intermediate the north D-pad position 130 and east D-pad position 132. Between the east position 132 and the south position 134, there are provided a pair of radially spaced switch pushbuttons 142 and 144, and between the south position 134 and the west position 136 there is also provided a pair of radially spaced switch pushbuttons 146 and 148. Further, between the west position 136 and the north position 130 there is provided a pair of radially spaced switch pushbuttons 126 and 128. Similarly, the D-pad 112 is surrounded by radially spaced pairs of switch pushbuttons. Between the north position 158 and east position 160 there is provided a pair of radially spaced switch pushbuttons 168 and 170 and between the east position 160 and south position 162 there is a pair of radially spaced switch pushbuttons 174 and 172. A pair of switch pushbuttons 178 and 160 are disposed radially between the south position 162 and the west position 164, and radially spaced between the west position 164 and north position 158 there is provided a pair of switch pushbuttons 182 and 180. While the switch pushbuttons 126, 128, 138, 140, 142, 144, 146, 148 and 168, 170, 172, 174, 176, 178, 180, 182 have been disclosed as being radially positioned with respect to the D-pads 110, 112, such may be arranged in side-by-side relationship or in angularly spaced relationship with respect to the D-pad 110, 112. Further, one or more of such switch pushbuttons may be associated with multi-position switches, and in particular, may be associated with two-position switches wherein one keystroke is accomplished by depressing one end of the switch and a separate keystroke is enabled by depression of the opposing end, as in a rocker type switch.

The upper surface controls 104 may also include a pair of multi-directional switches 154 and 156. Multi-directional switch 154 may be a cursor displacement control switch for inputting one of four directional inputs for use by a computer as an input for moving the cursor on a display screen. Multi-directional switch 156 may be utilized as a page/file displacement control switch to provide the PAGE UP, PAGE DOWN, HOME and END functions when system 100 is in a keyboard mode. Those switches may serve other functions when system 100 is in other than a keyboard mode. A plurality of single or multiple position switches may be provided to serve as function switches 152, providing the function switch input commonly found on conventional personal computer keyboards.

Figure 2:
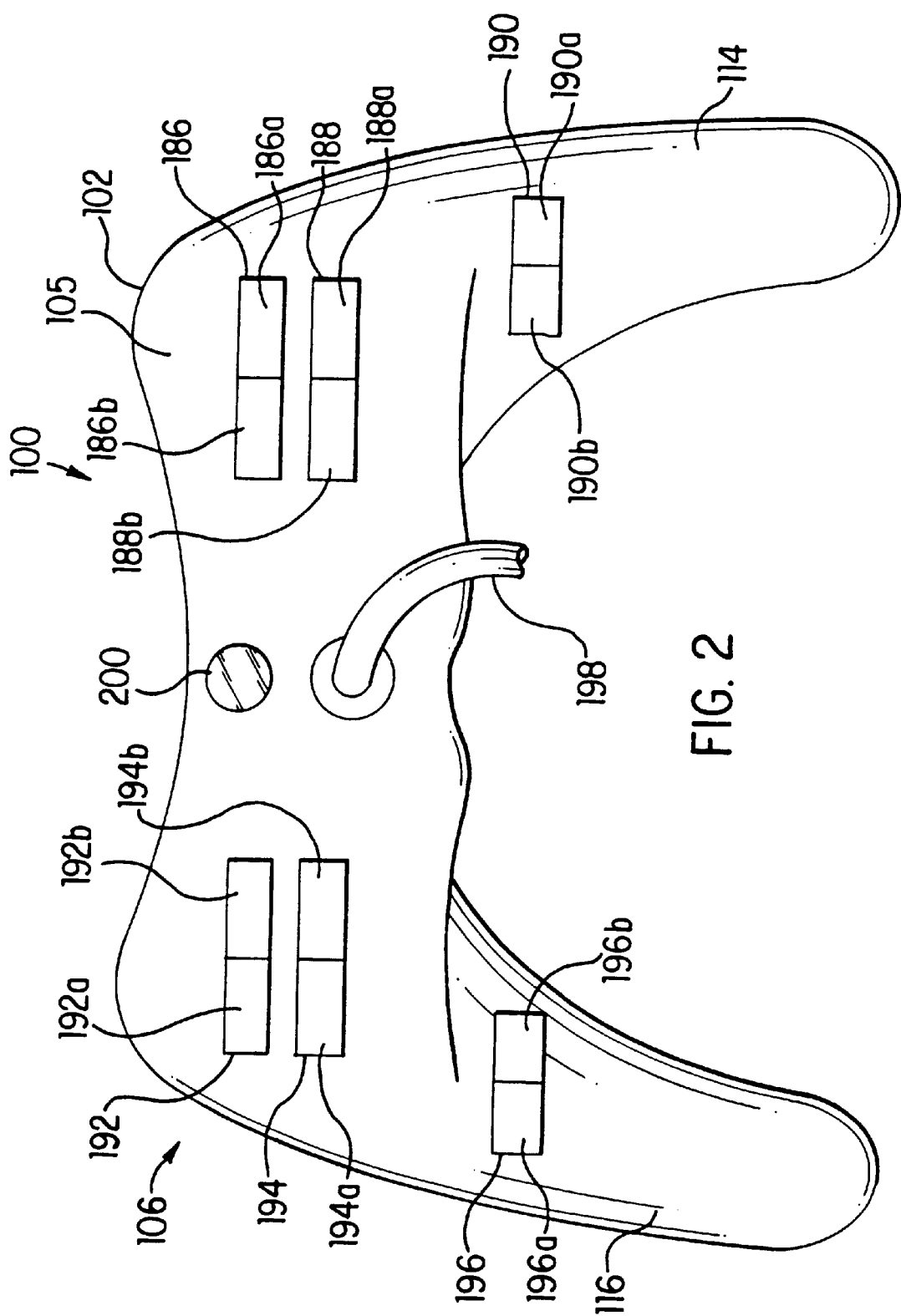
FIG. 2 is a rear elevation view of the present invention.

Referring now to FIG. 2, a rear view of the ergonomic base 102 of data entry system 100 is shown in order to depict the side surface controls 106. The hand grip portions 114 and 116 extend substantially orthogonally with respect to the upper surface of the ergonomic base allowing the user's hands to be disposed in a more natural vertical orientation. As each of the user's hands are wrapped around the respective handgrip portions 114 and 116, the user's digits are able to operate the side surface control switches 106 located on the back side 105 of ergonomic base 102. In the embodiment shown, each of the user's forefingers is intended to operate a selected one of two switch pushbuttons 192 and 194, 186 and 188. Each of the switch pushbuttons 192, 194, 186 and 188 are associated with two-position switches providing one keystroke when the user depresses a first end of the switch pushbutton 192*a*, 194*a*, 186*a*, 188*a* and another keystroke when the user depresses the opposing second end of the switch pushbutton 192*b*, 194*b*, 186*b*, 188*b*. Below the forefinger operated switch pushbuttons there is provided an additional two-position switch associated with switch pushbuttons 196, 190 for operation by a respective one of the user's middle fingers, with the remaining digits of the user being utilized to grasp the handgrip portions 114 and 116 and maintain the stability of data entry system 100.

The back side 105 of ergonomic base 102 is also provided with an optical communications port 200 for providing a wireless interface with one or more systems, as will be further described in following paragraphs. Port 200 consists of an infrared transparent window behind which is disposed one or more photo sensors and infrared emitting devices (not shown). For providing a hard wire interface, system 100 includes an interface cable 198. Interface cable 198 has connectors for coupling to a computer's keyboard port and the computer's game port or the controller port of a dedicated game system on an opposing end thereof (not shown). As an alternate to connecting to the personal computer's game port, the interface connection with the personal computer may be by way of the computer's serial or parallel ports, in addition to the keyboard port interface, or the interface cable may provide coupling to an interface bus of the computer.

In the keyboard mode, initiated by use of one of the mode selection controls 108, such as the switch 108*a*, shown in FIG. 1, character codes are transmitted from data system 100 by independent operation of any of the upper surface controls 104 and side surface controls 106. By use of the D-pads 110 and 112, and the plurality of two-position side surface controls 106, the character codes for at least a majority of the alphabetic characters of an alphabet can be generated by single individual switch operations, without resorting to chording. Where a combinational key activation (chording) is to be utilized, system 100 utilizes a cross-coupling technique, wherein a switch closure activated by a user's left thumb is combined with the operation of one of the side surface controls 192, 194 or 196. Conversely, when a switch closure activated by the user's right thumb is to be part of a combinational key activation, such is combined with operation of one of the switches 186, 188 or 190 operated by the digits of the user's left hand.

An exemplary representation of the character codes generated by individual and combinational switch activations is shown in Table 1.

TABLE 1

| SW  |   | 186a | 146b | 188a | 188b | 190a | 190b | 192a | 192b | 194a | 194b | 196a | 196b |
|-----|---|------|------|------|------|------|------|------|------|------|------|------|------|
| 130 |   |      |      |      |      |      |      | 2    | 1    | 4    | 3    | 6    | 5    |
| 132 | d |      |      |      |      |      |      | '    | "    | ;    | :    | !    | ?    |
| 134 | h |      |      |      |      |      |      | to   | the  | of   | and  | in   | for  |
| 136 | b |      |      |      |      |      |      | \|   | —    | >    | }    | <    | {    |
| 150 | . |      |      |      |      |      |      |      |      |      |      |      |      |
| 158 | p | 7    | 8    | 9    | 0    | +    | −    |      |      |      |      |      |      |
| 160 | r | /    | *    | \    | #    | @    | &    |      |      |      |      |      |      |

TABLE 1-continued

| SW | 186a | 146b | 188a | 188b | 190a | 190b | 192a | 192b | 194a | 194b | 196a | 196b |
|---|---|---|---|---|---|---|---|---|---|---|---|---|
| 162 | w | $ | % | ^ | with | that | was | | | | | |
| 164 | n | ) | ] | ( | [ | – | · | | | | | |
| 166 | , | | | | | | | | | | | |
| 186a | space | | | | | | | | | | | |
| 186b | a | | | | | | | | | | | |
| 188a | l | | | | | | | | | | | |
| 188b | e | | | | | | | | | | | |
| 190a | m | | | | | | | | | | | |
| 190b | I | | | | | | | | | | | |
| 192a | space | | | | | | | | | | | |
| 192b | 0 | | | | | | | | | | | |
| 194a | s | | | | | | | | | | | |
| 194b | u | | | | | | | | | | | |
| 196a | t | | | | | | | | | | | |
| 196b | y | | | | | | | | | | | |
| 138 | shift | | | | | | | | | | | |
| 140 | enter | | | | | | | | | | | |
| 142 | f | | | | | | Esc. | Esc. | | | | |
| 144 | j | | | | | | TAB | TAB | | | | |
| 146 | g | | | | | | | | | | | |
| 148 | k | | | | | | | | | | | |
| 126 | Alt | | | | | | | | | | | |
| 128 | Ctl | | | | | | | | | | | |
| 168 | Alt | | | | | | | | | | | |
| 170 | Ctl | | | | | | | | | | | |
| 172 | v | | | | | | | | | | | |
| 174 | z | | | | | | | | | | | |
| 176 | q | Back Spc. | Back Spc. | | | | | | | | | |
| 178 | x | DEL | INS | | | | | | | | | |
| 180 | shift | | | | | | | | | | | |
| 182 | enter | | | | | | | | | | | |

As shown in Table 1, all of the alphabetic characters in the English language are generated by individual switch closures, a portion thereof being generated by the upper surface controls 104 and a remaining portion being generated by the side surface controls 106.

When the mode is changed from the keyboard mode to the game controller mode, such as by activating switch 108*a* for a second time, the upper surface controls 104 and side surface controls 106 provide device input signals that are output to a computer's game port or to the controller input port of a dedicated game system. Thus, one or both of the D-pads 110, 112 provide directional input for use by game software and one or more of the side surface controls 186, 188, 190, 192, 194, 196 provide switch closure signals which are typically utilized by game software to control the firing of weapons, and provide control of particular maneuvers of the game icons, such as jumping, flying, and the like.

When in a mode to control some other device, such as a telephone, dedicated Internet connection device, a TV/cable tuner, video entertainment device, or an audio entertainment device, the upper surface controls 104 and side surface controls 106 are utilized to provide the necessary signals to control the device, answer or dial a telephone, move a cursor, change the channel of a tuner, initiate the playing of a video tape or disc, or to change the volume or station on a stereo, for example. The particular switches of upper surface controls 104 and side surface controls 106 which are utilized to perform those functions, are not important to the inventive concepts embodied herein, and it is contemplated that such assignments may be programmable by the users to suit their own tastes.

Due to the large number of control functions which are possible utilizing upper surface controls 104 and side surface controls 106, the control of several devices may be combined in a single mode. Thus, a home entertainment mode could include operation of a TV cable tuner 340, one or more video devices 350 and one or more audio devices 360, utilizing the separate D-pads 110 and 112 and the switch pushbuttons 186, 188, 190, 192, 194 and 196. In such an arrangement, data entry system 100 would be interfaced with a personal computer 300 utilizing the interface cable 198 for communicating with the computer in both the keyboard mode and the game controller device mode. In the home entertainment device mode, data entry system 100 could communicate with the various devices to be controlled utilizing the optical communications port 200.

Figure 5:
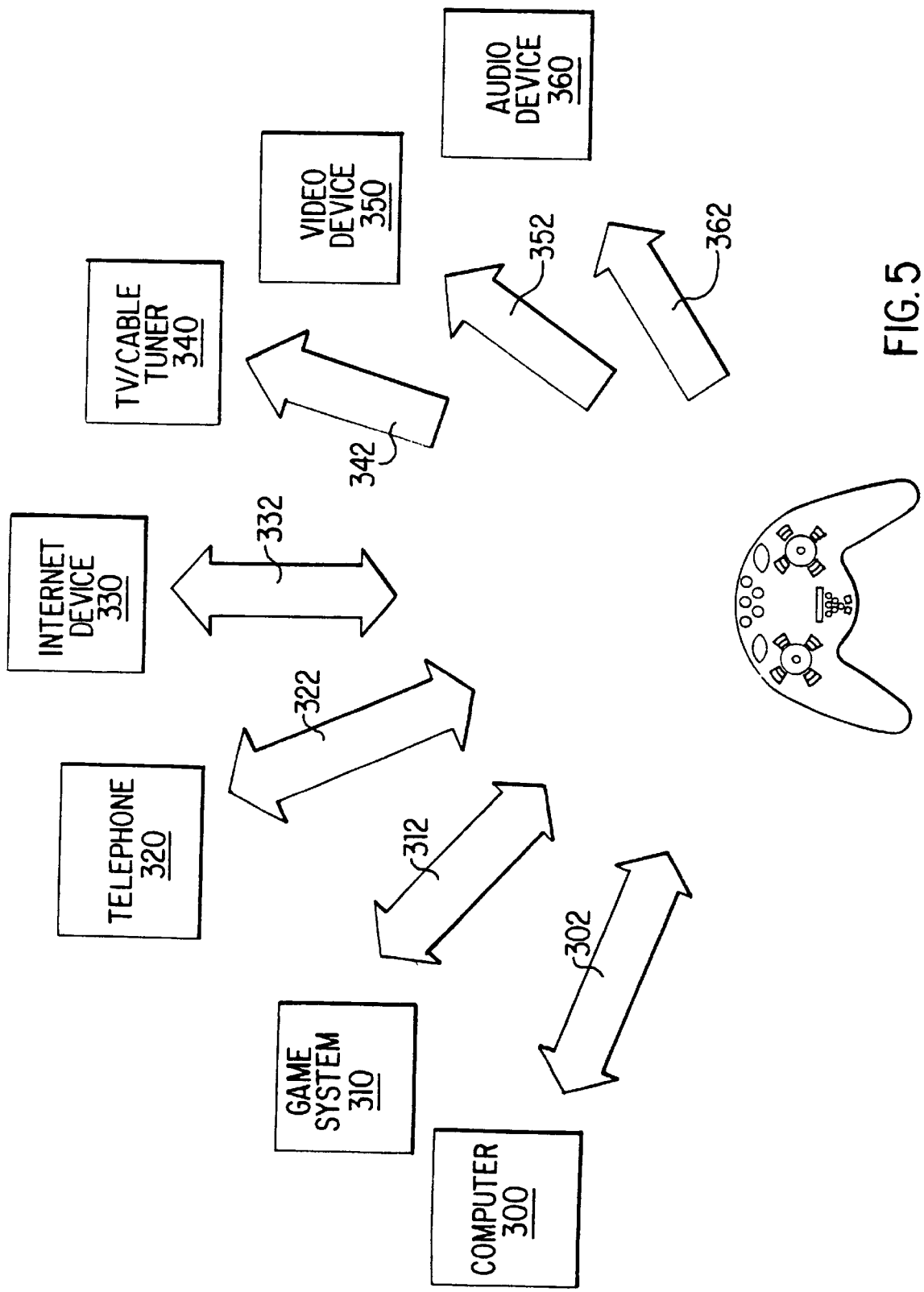
FIG. 5 is a block diagram illustrating the multi-mode functions of the present invention; and, FIG. 6 is a circuit block diagram of the present invention.

Therefore, it can be seen that data entry system 100 is very versatile and may be utilized to interface with a plurality of entertainment, computational and communications devices, as illustrated in FIG. 5. Data entry system 100 is intended to communicate with a computer 300, which may be a personal computer, wherein a data link 302 may be established utilizing the interface cable 198 or optical communications port 200. When coupled to computer 300, data entry system 100 may be utilized in a keyboard mode wherein the single and combinational switch closures provided through operation of the upper surface controls 104 and side surface controls 106 establish signals which are output to the computer to represent alphanumeric characters, punctuation, mathematical operators, and commonly used words such as "the", "to", "and", "of", "for", "in", "with", "that", and "was", for example. When the computer is utilized for playing games, data entry system 100 is switched into a game controller mode, wherein the same switch closures which previously generated a character code input to the keyboard port of the computer, now are input to the game port as input signals representing directional and operational control signals.

Data entry system 100 may be coupled directly to a dedicated game system 310, such as the type manufactured by Nintendo, Sega, Sony and others for communication over a data link 312. If the dedicated game system 310 accepts alphanumeric character input codes, data entry system 100 may be utilized in a mode to provide such input. Whether coupled to computer 300 or dedicated game system 310, data entry system 100 may be placed in other device modes for communicating with other systems, such as the telephone system 320 through the data channel 322. When coupled to telephone system 320, the user provides voice input through a microphone 184, and receives voice output by means of a speaker (not shown) located in the telephone system 320 or data entry system 100. Preferably, the communications over the data link 322 would be a wireless communications link such as by use of the optical communications port 200, but may be by way of a radio frequency communications port disposed within ergonomic base 102. Similarly, data entry system 100 may be utilized for interface with a dedicated Internet device 330 through a data link 332, to provide the appropriate keyboard character codes and cursor positioning input to the Internet device 330. As previously mentioned, data entry system 100, acting as an infrared remote control, may be utilized to control such home entertainment devices as the TV/cable tuner 340 through data link 342, video device 350 (which may be a video tape recorder, video disc player, or the like) through the data link 352, and the audio entertainment device 360 (which may be a stereo tuner, audio tape deck, CD player, or the like) through the data link 362. The particular data links 302, 312, 322, 332, 342, 352, 362 represent a hardwired or wireless communications path for unidirectional or bidirectional transmission of data, utilizing the appropriate coding for the particular device being communicated with.

Figure 6:
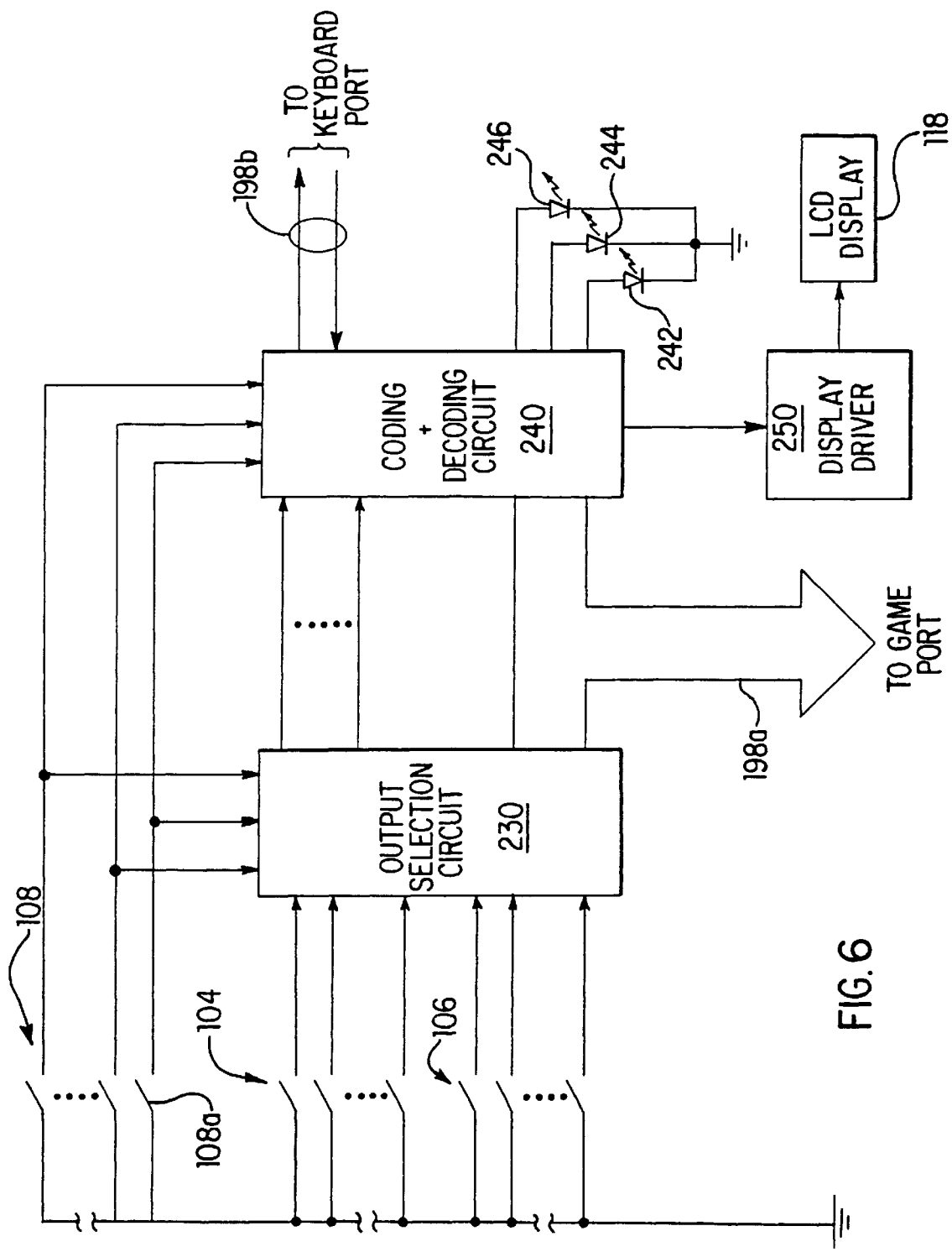

Referring now to FIG. 6, there is shown a block diagram of the circuit arrangement for coupling the switch closures of the upper surface controls 104 and side surface controls 106 to the appropriate port. As the coding circuitry for converting individual switch closures into the digital character codes utilized by most computers are well known, such are not detailed here. The coding and decoding circuit block 240 includes the well known circuitry for converting switch closures to character codes and for decoding any control signals which may be supplied from the computer to the keyboard. The coding and decoding circuitry 240 is controlled by input from the mode selection switches 108, allowing different coding schemes to be utilized, depending upon the mode selected, and coupling such to either the keyboard port, through a respective portion 198b of the interface cable 198 or to the game, serial, or parallel port through portion 198a of the interface cable 198, as required by the computer being communicated with. An output of the coding and decoding circuitry 240 is also coupled to display driver circuitry 250, which in turn provides an output to the LCD display 118 for indicating the mode of system 100. Other information transmitted between the computer and system 100 may also be displayed on LCD display 118. Coding and decoding circuitry 240 also provides an output to several light emitting diodes (LEDs) to indicate the status of certain keyboard functions. In particular, the LED 242 may represent the NUM LOCK indicator, the LED 244 may represent the CAP LOCK indicator and the LED 246 may represent the SCROLL LOCK indicator.

In the keyboard mode, the individual contact closures of the upper surface controls 104 and side surface controls 106 are coupled to the coding and decoding circuitry 240 by means of an output selection circuit 230. Output selection circuit 230 provides a switching function responsive to the mode of operation selected through the mode selection controls 108. Thus, in the keyboard mode the switch closures from the upper surface controls 104 and side surface controls 106 are passed to the coding and decoding circuitry 240. In the game controller mode, however, the switch closures of the upper surface controls 104 and side surface controls 106 are coupled directly to the game port through the portion 198a of the interface cable 198. Alternately, the cable portions 198a and 198b may be replaced with a connection to the optical communications port 200 for providing a wireless coupling with the computer, and/or other device.

Figure 2A:
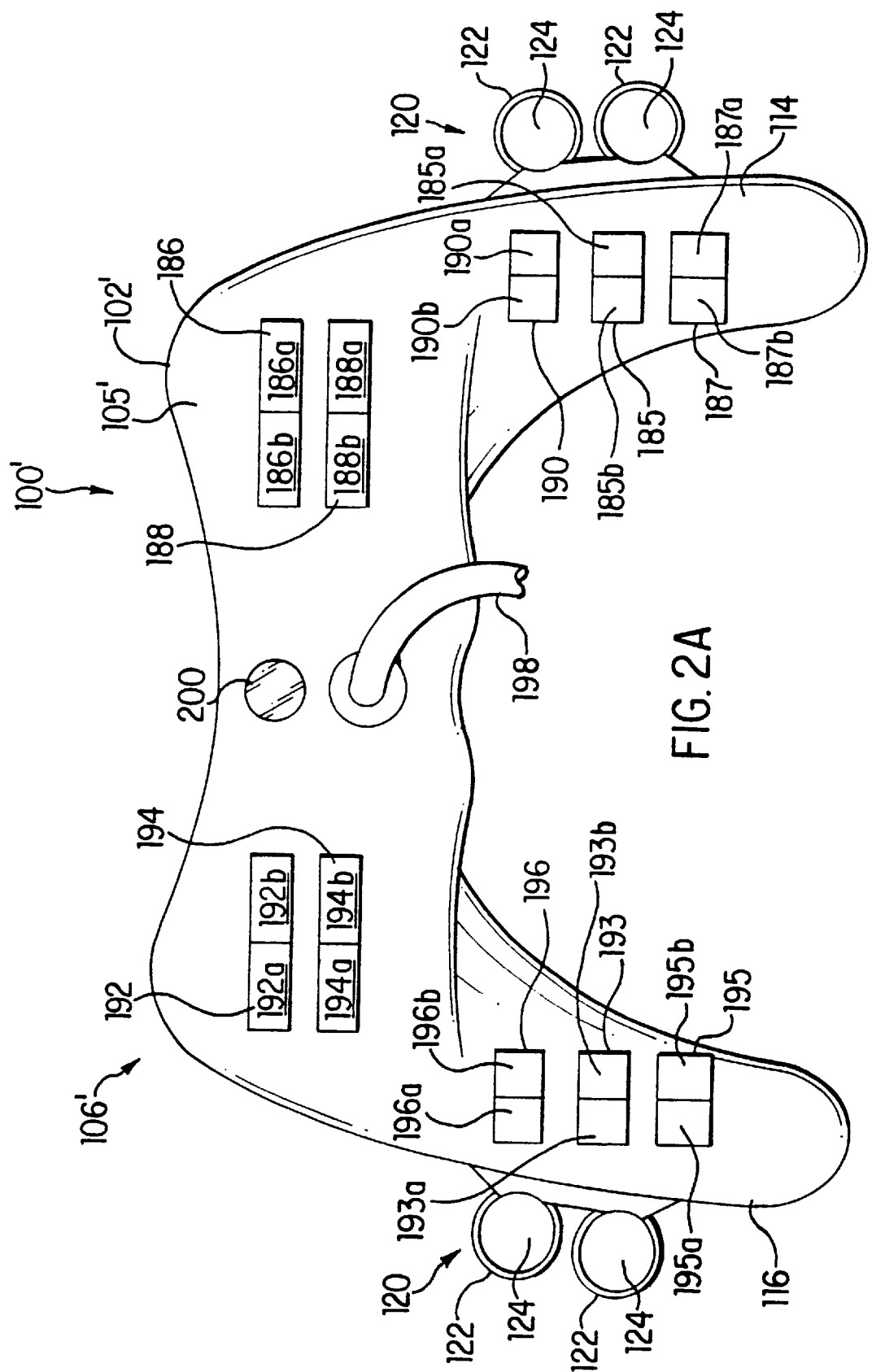
FIG. 2A is a rear elevation view of another configuration of the present invention.

Data entry system 100' represents an alternate configuration wherein the back side 105' of the ergonomic base 102' provides two directional switches to be operated by the digits of each of the user's hands, as shown in FIG. 2A. In this arrangement, the user's forefingers selectively operate the switch pushbuttons 186, 192 and 188, 194 and the middle finger is utilized to activate the switch pushbuttons 190 and 196, as in the previously described arrangement. The side surface controls 106', however, include two pairs of additional switch pushbuttons for operation by additional digits of the user's hands. The user's ring fingers are used to operate the switch pushbuttons 185 and 193, respectively, while the user's pinky fingers operate the switch pushbuttons 187 and 195. As each of the side surface control switches 106' can provide one of two contact closures, depending upon the direction in which they are pushed, such provide a total of ten different contact closures initiated by four of the digits of each of the user's hands, providing a total of twenty contact closures for use individually to generate characters, or in combination with the upper surface controls 104, as previously described. For ease of use, only the side surface control switch pushbuttons 186, 188, 190, 192, 194, and 196 are utilized in combination with the upper surface control switches 104. Assignment of switch functions for the upper surface control switches 104, side surface control switches 106' and the combination thereof is shown in Tables 2 and 3. Table 2 identifies the characters generated utilizing the user's left thumb and right fingers, and Table 3 illustrates the characters generated using the user's right thumb and left fingers.

TABLE 2

| Sw. | | 192a | 192b | 194a | 194b | 196a | 196b |
|---|---|---|---|---|---|---|---|
| 130 | l | 2 | 1 | 4 | 3 | 6 | 5 |
| 132 | b | ' | " | ; | : | ! | ? |
| 134 | x | to | the | of | and | in | for |
| 136 | j | > | } | < | { | \| | — |
| 150 | . | | | | | | |
| 126 | ALT | | | | | | |
| 128 | CTL | | | | | | |
| 138 | SHIFT | | | | | | |
| 140 | ENTER | | | | | | |
| 142 | ESC. | | | | | | |
| 144 | TAB | | | | | | |
| 146 | − | | | | | | |
| 148 | + | | | | | | |
| 192a | , | | | | | | |
| 192b | o | | | | | | |
| 194a | k | | | | | | |
| 194b | w | | | | | | |
| 196a | s | | | | | | |
| 196b | a | | | | | | |
| 193a | n | | | | | | |
| 193b | u | | | | | | |
| 195a | g | | | | | | |
| 195b | h | | | | | | |

TABLE 3

| Sw. |       | 186a | 186b | 188a | 188b | 190a | 190b |
|-----|-------|------|------|------|------|------|------|
| 158 | c     | 7    | 8    | 9    | 0    | +    | −    |
| 160 | p     | /    | *    | \    | #    | @    | &    |
| 162 | q     | $    | %    |      | was  | that | with |
| 164 | z     | )    | ]    | (    | [    | −    | '    |
| 166 | ,     |      |      |      |      |      |      |
| 168 | ALT   |      |      |      |      |      |      |
| 170 | CTL   |      |      |      |      |      |      |
| 172 | ESC.  |      |      |      |      |      |      |
| 174 | BK SP |      |      |      |      |      |      |
| 176 | DEL   |      |      |      |      |      |      |
| 178 | INS   |      |      |      |      |      |      |
| 180 | SHIFT |      |      |      |      |      |      |
| 182 | ENTER |      |      |      |      |      |      |
| 186a | .    |      |      |      |      |      |      |
| 186b | e    |      |      |      |      |      |      |
| 188a | v    |      |      |      |      |      |      |
| 188b | m    |      |      |      |      |      |      |
| 190a | r    |      |      |      |      |      |      |
| 190b | I    |      |      |      |      |      |      |
| 185a | t    |      |      |      |      |      |      |
| 185b | y    |      |      |      |      |      |      |
| 187a | f    |      |      |      |      |      |      |
| 187b | d    |      |      |      |      |      |      |

As data entry system 100' utilizes all of the user's digits for data entry, it may be difficult for the user to both support the ergonomic base 102 while operating the upper surface control switches 104 and side surface control switches 106' and such could also be true for system 100. To provide additional support for data entry system 100, 100' the ergonomic base 102, 102' may employ strategically located indentations (not shown) or finger loop supports 120 coupled to the respective hand grip portions 114 and 116 of the ergonomic base 102, 102'. Although the finger loop supports are only shown in conjunction with the configuration shown in FIG. 2A, such is applicable for use with the configuration shown in FIG. 2. Each finger loop support 120 includes a pair of support rings 122, each having an aperture 124 through which the user's respective fingers pass. By use of the finger loop supports 120 the ergonomic base 102, 102' can be supported during periods of time when the user's grip is lessened due to utilization of the user's digits to depress respective switches of the side surface controls 106, 106'.

Figure 4:
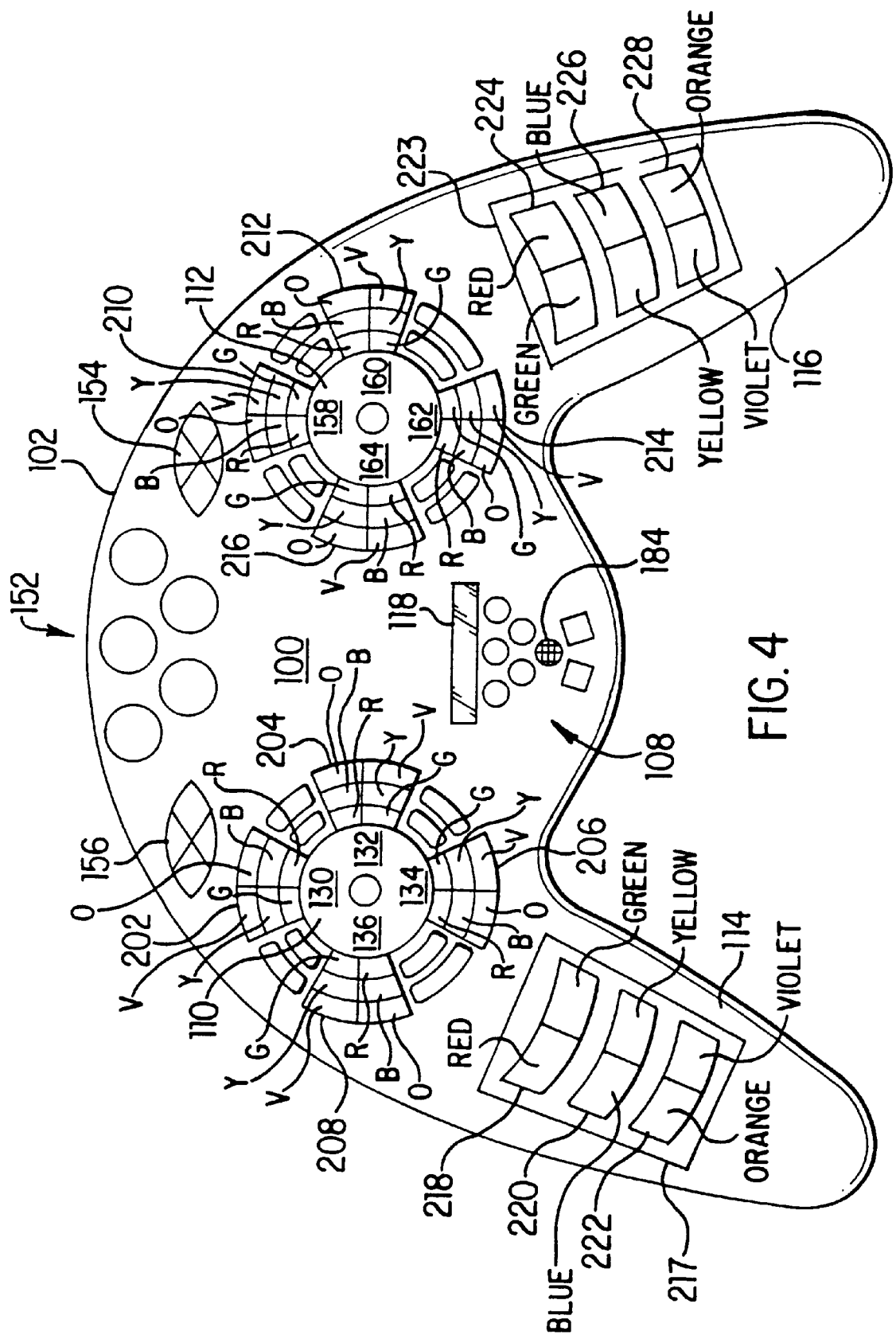
FIG. 4 is a plan view of the present invention showing the addition of labeling thereto.

To make use of data entry system 100, 100' easier to use, indicia carrying labels 202, 204, 206, 208, 210, 212, 214, 216, 217 and 223 are provided, as shown in FIG. 4. Label 217 includes respective finger switch label portions 218, 220 and 222 which represent the switch pushbuttons 186, 188 and 190 disposed on the back side 105 of ergonomic base 102. Each of the labeled portions 218, 220 and 222 carry indicia indicating the particular character generated when the switch is operated. Additionally, each is color coded to aid the user in identifying the characters generated when the respective switches 186, 188 and 190 are utilized in combination with the D-pad 112. Angularly disposed about the D-pad 112 are thumb switch labels 210, 212, 214 and 216. Each of the labels is located adjacent a respective switch position (north, east, south, west) and carrying indicia indicating the particular characters generated when that particular switch position is operated in combination with one of the switches 186, 188, or 190. The representation of characters generated when the particular positions of the D-pad 112 are operated independently, are embossed, or otherwise printed, on the D-pad disc itself. Each of the labels 210, 212, 214 and 216 are divided into two columns with three radially spaced rows to define six blocks, each block defined thereby being color coded in coordination with the label portions 218, 220 and 222 of label 217, thereby cuing the user as to what character is generated by the switch combination, by virtue of the matching colors. Similarly, the hand grip 116 carries a label 223 with finger switch label portions 224, 226 and 228. Although the label portions 224, 226 and 228 are shown to carry the same color codes as those of label portions 218, 220, 222, such may be coded utilizing different colors. As in the case of D-pad 112, D-pad 110 is also surrounded by thumb switch labels 202, 204, 206 and 208, each subdivided and color coded, as previously described.

Therefore, it can be seen that data entry system 100, 100' provides an ergonomic housing adapted to be held by two hands of a user. Mounted on the housing are a plurality of switches for operation by at least one digit of the user's hands. Further, means are provided on the housing for selecting between a first, game controller, operating mode and a second, keyboard, operating mode. Within the housing there is provided circuitry for coupling an output of at least a portion of the plurality of switches as game input data responsive to the selection of the first operating mode and converting an output of at least a portion of the plurality of switches to alphanumeric character code data responsive to selection of the second operating mode. By utilization of directional switch pads, commonly utilized in game controllers for input of alphanumeric characters in the keyboard mode, and utilization of a plurality of side surface control switches, a majority of alphabetic characters of an alphabet can be generated without resorting to a chording arrangement wherein multiple switches must be utilized in combination. For the English language, all of the alphabetic characters can be generated without resorting to chording. Still further, other device controlling modes may be incorporated into data entry system 100, those modes providing control signals for controlling one or more of the devices selected from the group consisting of a video entertainment device, audio entertainment device, cable/television tuning device, telephonic device, Internet interface device, game machine, and combinations thereof.

Although the invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A data entry system, comprising:

an ergonomic base adapted to be graspable by two hands of a user, said ergonomic base having an upper surface and a side surface;

upper surface control means disposed on said ergonomic base upper surface and adapted for operation by either of two of a user's digits to generate a first set of electrical signals, said first set of electrical signals representing a first portion of alphabetic characters of an alphabet; and, side surface control means disposed on said ergonomic base side surface and adapted for operation by at least another of a user's digits on either of the user's two hands to generate a second set of electrical signals when operated independently of said upper surface control means, said second set of electrical signals representing a second portion of alphabetic characters of the alphabet, said first and second portions of alphabetic characters together representing at least a majority of alphabetic characters of the alphabet, said side surface control means generating a third set of electrical signals when operated in combination with said upper surface control means.

2. The data entry system as recited in claim 1 where said ergonomic base includes a pair of hand grip portions extending angularly with respect to a plane defined by said upper surface, each of said pair of hand grip portions extending substantially orthogonally with respect to said upper surface plane.

3. The data entry system as recited in claim 2 where each of said hand grip portions includes support means for assisting in support of said ergonomic base while said side surface control means is being operated, said support means being formed by at least a pair of loop-shaped members respectively coupled to said pair of hand grip portions for a user's fingers to pass therethrough.

4. The data entry system as recited in claim 1 where said upper surface control means includes at least one multi-position input device for providing at least four discrete output signals representing at least four alphabetic characters responsive to said multi-position input device being displaced in each of four discrete directions.

5. The data entry system as recited in claim 1 where said third set of electrical signals are generated only by combining operation of said upper surface control means by one of a user's hands with operation of said side surface control means by the other of a user's hands.

6. A data entry system, comprising:

an ergonomic base adapted to be graspable by two hands of a user, said ergonomic base having an upper surface and a side surface, said ergonomic base including a pair of hand grip portions extending angularly with respect to a plane defined by said upper surface, each of said hand grip portions being adapted to be grasped by the user's fingers;

upper surface control means disposed on said ergonomic base upper surface, said upper surface control means includes a plurality of first switches adapted for operation by a user's thumbs to generate a first set of electrical signals, said first set of electrical signals representing a first portion of alphabetic characters of an alphabet; and, side surface control means disposed on said pair of hand grip portions, said side surface control means including a plurality of second switches adapted for operation by other of a user's fingers of the user's two hands to generate a second set of electrical signals when operated independently of said upper surface control means, said second set of electrical signals representing a second portion of alphabetic characters of the alphabet, said first and second portions of alphabetic characters together representing at least a majority of alphabetic characters of the alphabet, said side surface control means generating a third set of electrical signals when operated in combination with said plurality of first switches.

\* \* \* \* \*